(12) United States Patent
Shin

(10) Patent No.: US 8,630,738 B2
(45) Date of Patent: Jan. 14, 2014

(54) REFORMER AND CONTROL METHOD THEREFOR

(75) Inventor: Woo-Cheol Shin, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 876 days.

(21) Appl. No.: 12/695,951

(22) Filed: Jan. 28, 2010

(65) Prior Publication Data
US 2011/0054692 A1 Mar. 3, 2011

(30) Foreign Application Priority Data

Sep. 2, 2009 (KR) .................. 10-2009-0082440

(51) Int. Cl.
*G05B 15/00* (2006.01)
*B01J 8/00* (2006.01)

(52) U.S. Cl.
USPC ............ 700/266; 700/274; 48/119; 48/127.7; 48/197 R; 422/105; 422/108; 422/109; 422/625; 422/627

(58) Field of Classification Search
USPC ......... 422/105, 108, 109, 110, 625, 626, 627; 700/266, 274; 48/127.7, 119
See application file for complete search history.

(56) References Cited

U.S. PATENT DOCUMENTS

| 6,752,968 | B2 * | 6/2004 | Hashigaya et al. ........... 422/110 |
| 6,797,420 | B2 * | 9/2004 | Ukai et al. .................... 429/410 |
| 6,919,055 | B2 * | 7/2005 | Kondo et al. ................. 422/209 |
| 8,329,353 | B2 * | 12/2012 | Yasuda et al. ................ 429/436 |

FOREIGN PATENT DOCUMENTS

| JP | 07-296834 | 11/1995 |
| JP | 2005-170741 | 6/2005 |
| JP | 2005-285593 | 10/2005 |
| JP | 2006-196203 | 7/2006 |
| JP | 2008-135284 | 6/2008 |
| JP | 2008-226663 | 9/2008 |
| KR | 10-2007-0035215 A | 3/2007 |

OTHER PUBLICATIONS

KIPO Office action dated May 19, 2011 in priority Application No. 10-2009-0082440, listing the cited references, 1 sheet.

* cited by examiner

*Primary Examiner* — Nina Bhat
(74) *Attorney, Agent, or Firm* — Christie, Parker & Hale, LLP

(57) ABSTRACT

A reformer having improved performance and stability and a reformer control method, the reformer including a reforming reaction unit, a first sensor, a heat source unit, a second sensor, and a flow control unit. The reforming reaction unit converts a first fuel into a reformate. The first sensor senses a first temperature of the reformate generated from the reforming reaction unit. The heat source unit heats the reforming reaction unit with a combustion heat of a second fuel. The second sensor senses a second temperature at a fuel inlet of the heat source unit. The flow control unit controls a temperature of the reformate by regulating a flow of an oxidizer supplied to the heat source unit based on the first temperature, and controls a temperature of the heat source unit by regulating a flow of the second fuel supplied to the heat source unit based on the second temperature.

9 Claims, 8 Drawing Sheets

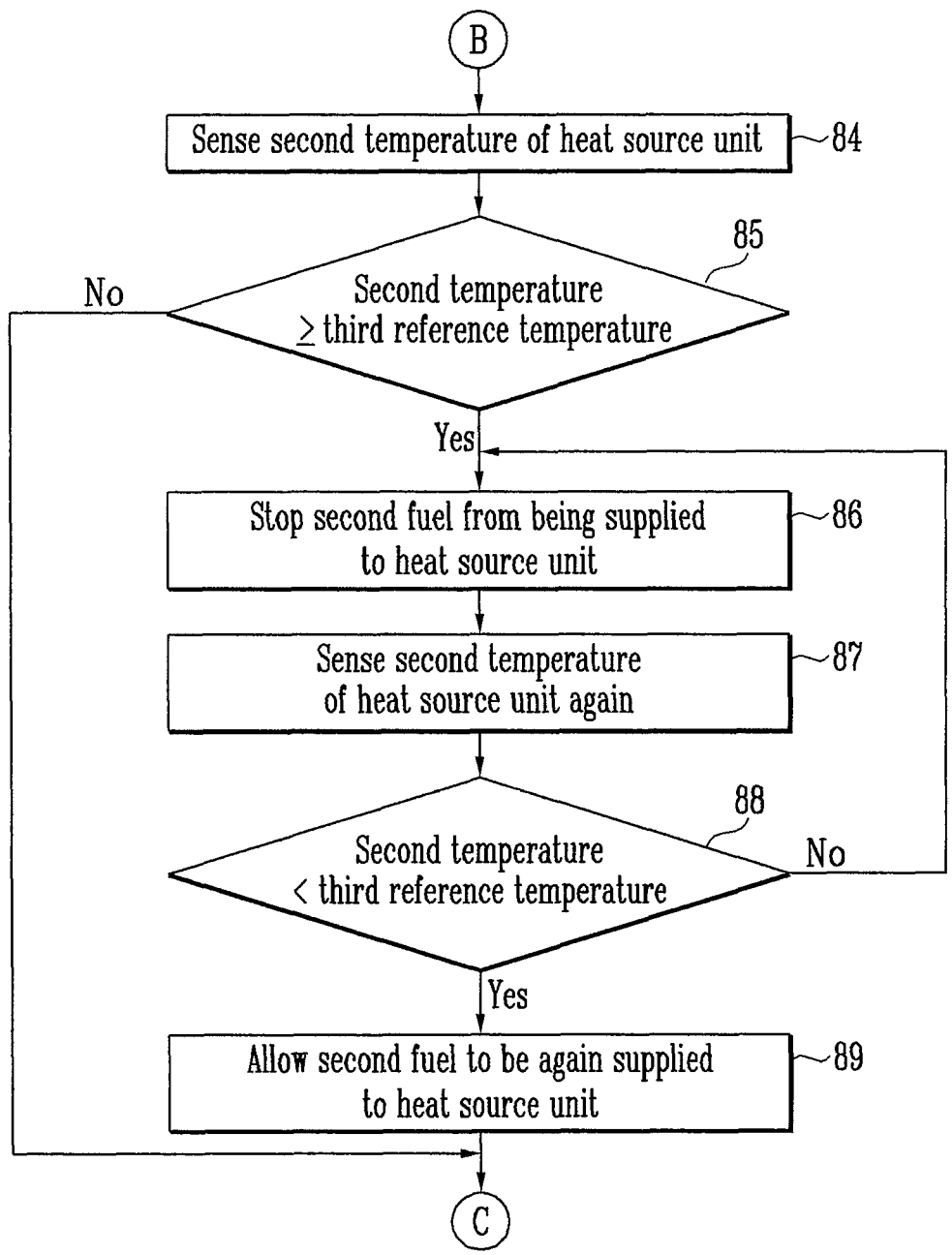

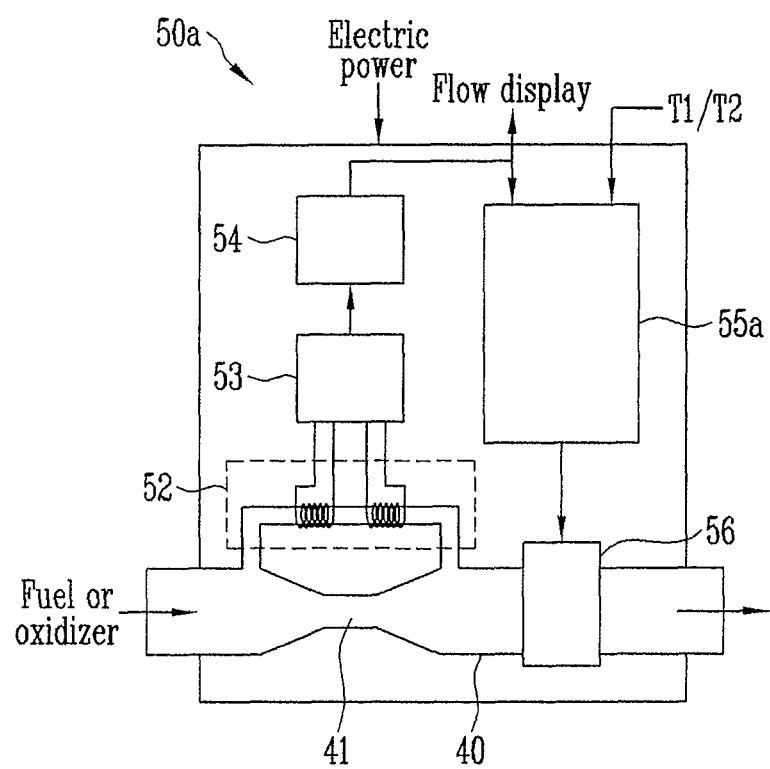

REFORMER AND CONTROL METHOD THEREFOR

CROSS-REFERENCE TO RELATED APPLICATION

This application claims priority to and the benefit of Korean Patent Application No. 10-2009-0082440, filed on Sep. 2, 2009, in the Korean Intellectual Property Office, the entire content of which is incorporated herein by reference.

BACKGROUND

1. Field

Aspects of the present invention relate to a reformer for converting a fuel into a reformate that is rich in hydrogen and a control method for the reformer.

2. Description of the Related Art

In general, a reformer is an apparatus in which a hydrocarbon-based fuel is treated at a high temperature to modify the structure of hydrocarbon that is a component of the hydrocarbon-based fuel, thereby generating a desired component or reformate, e.g., a hydrogen-rich gas. Such a reformer may be manufactured as a direct oxidation type reformer using a burner or as an oxidation catalyst type reformer using an oxidation catalyst. The hydrocarbon-based fuel may include liquefied petroleum gas (LPG), methane ($CH_4$), methanol, gasoline, light oil, coal, bio-ethanol and the like. The hydrogen gas generated in the reformer may be used as a fuel of a fuel cell.

SUMMARY OF THE INVENTION

An aspect of an embodiment of the present invention is directed toward a control method of a reformer that is capable of uniformly controlling the temperature of a reformate generated by the reformer.

An aspect of an embodiment of the present invention is directed toward a control method of a reformer capable of preventing or protecting the reformer from being damaged by increasing the temperature of a heat source for heating the reformer to at least a critical temperature.

An aspect of an embodiment of the present invention is directed toward a reformer which can enhance its performance and efficiency and improve its stability by employing the aforementioned control method(s).

According to an embodiment of the present invention, there is provided a reformer including a reforming reaction unit for converting a first fuel into a reformate; a first sensor for sensing a first temperature of the reformate generated from the reforming reaction unit; a heat source unit for heating the reforming reaction unit with a combustion heat of a second fuel; a second sensor for sensing a second temperature at a fuel inlet of the heat source unit; and a flow control unit for controlling a temperature of the reformate by regulating a flow of an oxidizer supplied to the heat source unit based on the first temperature sensed by the first sensor, and controlling a temperature of the heat source unit by regulating a flow of the second fuel supplied to the heat source unit based on the second temperature sensed by the second sensor.

According to an embodiment of the present invention, there is provided a control method for a reformer having a first sensor, a second sensor and a flow control unit, the control method including sensing a first temperature of a reformate generated from a reforming reaction unit through the first sensor; sensing a second temperature at a fuel inlet of a heat source unit for supplying heat to the reforming reaction unit through the second sensor; and controlling a temperature of the reformate by regulating the flow of an oxidizer supplied to the heat source unit based on the first temperature, and controlling a temperature of the heat source unit by regulating the flow of a second fuel supplied to the heat source unit based on the second temperature.

In one embodiment, the flow control unit controls the flow of the second fuel and oxidizer so that the difference between the first and second temperatures is within a substantially constant range.

When the first temperature is less than a reference temperature, the flow control unit may increase the flow of the oxidizer by a set or predetermined amount at a constant time interval.

When the second temperature is less than the reference temperature, the flow control unit may increase the flow of the second fuel by a set or predetermined amount at a constant time interval. In this case, the flow control unit may increase the flow of the oxidizer by a set or predetermined amount while increasing the flow of the second fuel.

In one embodiment, when the second temperature is identical to or greater than a critical temperature, the flow control unit stops the second fuel from being supplied to the heat source unit.

The flow control unit may include at least one valve for regulating the flow of at least one of the second fuel or the oxidizer. In this case, the flow control unit may be configured to automatically control the opening degree of the valve to correspond to a level of at least one of the first and second temperatures.

The flow control unit may include at least one compressor for compressing at least one of the second fuel or the oxidizer so as to control the flow of at least one of the second fuel or the oxidizer. In this case, the flow control unit may be configured so that the pressure of the compressor is automatically controlled to correspond to a level of at least one of the first and second temperatures.

According to these embodiments of the present invention, the temperature of the reformate generated from the reformer can be stably maintained. Accordingly, the operation stability of the reformer is improved, thereby enhancing its performance and reliability. Further, the temperature of the reformate is substantially controlled to be constant, thereby improving uniformity of the composition in the reformate generated from the reformer. Accordingly, it is possible to enhance the performance and stability of a fuel cell system using the reformer. Particularly, it is possible to prevent the operation of the reformer from being abruptly stopped, thereby contributing to stable operation of the fuel cell system for a long period of time.

BRIEF DESCRIPTION OF THE DRAWINGS

The accompanying drawings, together with the specification, illustrate exemplary embodiments of the present invention, and, together with the description, serve to explain the principles of the present invention.

FIGS. 2A, 2B, 2C and 2D are flowcharts illustrating a control method for a reformer according to an embodiment of the present invention.

FIG. 3 is a schematic configuration view of a flow control unit according to an embodiment of the present invention.

DETAILED DESCRIPTION

Figure 1:
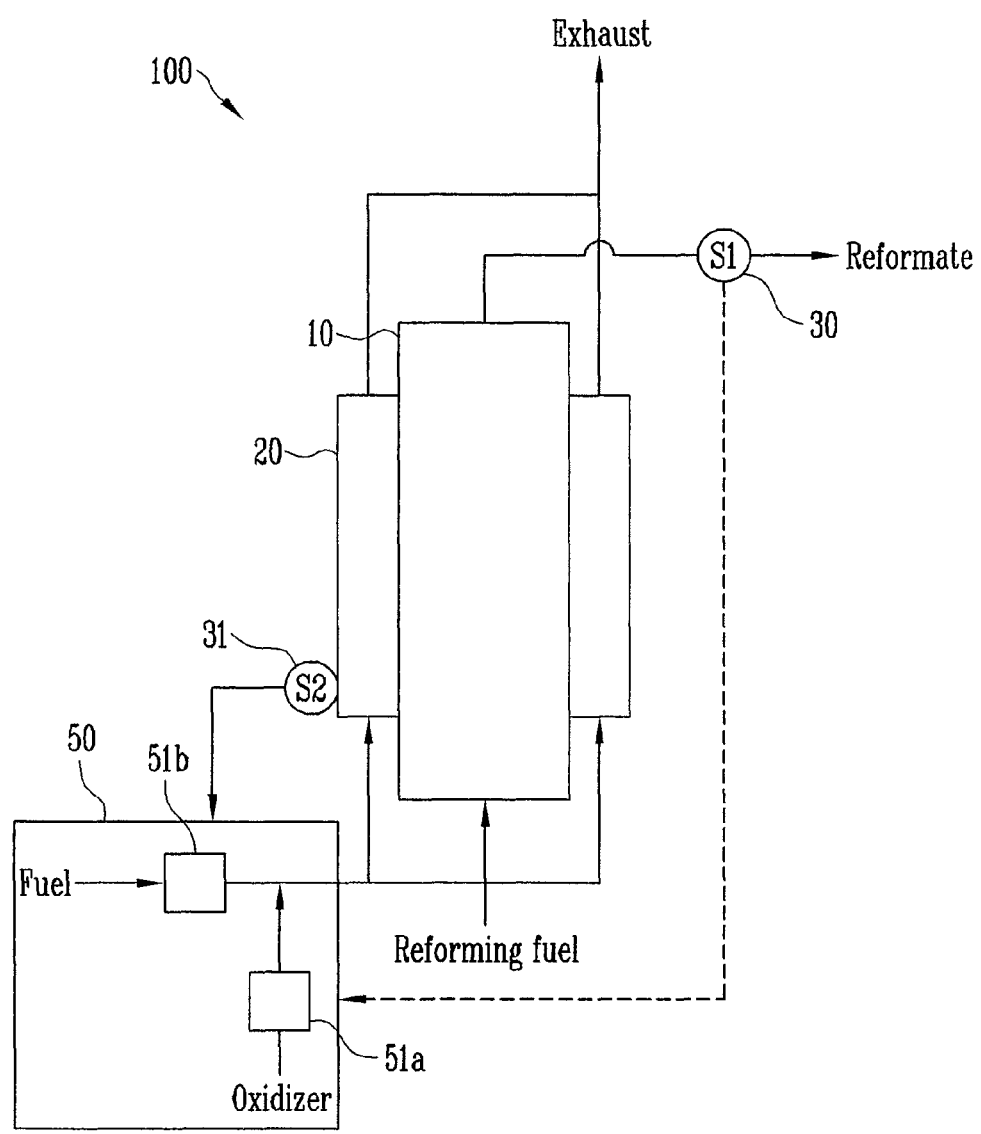
FIG. 1 is a schematic configuration view of a reformer according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

FIG. 1 is a schematic configuration view of a reformer according to an embodiment of the present invention.

Referring to FIG. 1, the reformer 100 includes a reforming reaction unit (a reforming reactor) 10 for converting a first fuel into a reformate by a catalyst reaction under a high temperature atmosphere; a heat source unit (a heater) 20 for heating the reforming reaction unit 10 with combustion heat of a second fuel; a first sensor 30 for sensing a temperature (hereinafter, referred to as a first temperature) of the reformate generated from the reforming reaction unit 10; a second sensor 31 for sensing a temperature (hereinafter, referred to as a second temperature) of the heat source unit 20; and a flow control unit (a flow controller) 50.

The flow control unit 50 is configured to independently control the flow of a fuel supplied to the heat source unit 20 and the flow of an oxidizer supplied to the heat source unit 20. That is, the flow control unit 50 controls the flow of the oxidizer supplied to the heat source unit 20 based on the first temperature sensed by the first sensor 30 so as to control the temperature of the reformate, and controls the flow of the second fuel supplied to the heat source unit 20 based on the second temperature sensed by the second sensor 31 so as to control the temperature of the heat source unit 20.

Accordingly, the reformer 100 can discharge a reformate from the reforming reaction unit 10 at a substantially constant temperature. In other words, the composition of the reformate can be maintained substantially constant. As such, since the capacity of a carbon monoxide remover and/or a fuel cell stack connected to a rear end of the reformer 100 can now be properly estimated by using the aforementioned reformer 100, design freedom of a fuel cell system can be increased, miniaturization of the system can be promoted, and performance and stability of the system can be enhanced.

Certain components of the reformer 100 will be described below in more detail. Here, in one embodiment, the reforming reaction unit 10 includes a reactor for steam reforming reaction. In this case, if the first fuel and steam are flowed into the reforming reaction unit 10, a reformate that is rich in hydrogen is generated by the steam reforming reaction. The first fuel may include methane, propane and the like. When methane is used as the first fuel, the steam reforming reaction can be expressed by Reaction Formula 1.

$$CH_4(g) + H_2O(g) \rightarrow CO(g) + 3H_2 \text{(endothermic reaction)} \quad (1)$$

The heat source unit 20 may be provided with a direct oxidation type reactor using a burner or an oxidation catalyst type reactor using a catalyst. A Ni or Ni/Ru catalyst may be used as the oxidation catalyst. The heat source unit 20 supplies heat energy generated by an oxidation reaction of the second fuel to the reforming reaction unit 10. For example, if the second fuel (e.g., city gas) with an S/C (mole of steam/mole of carbon (C) in a raw material gas) of 2.5 is supplied to the reforming reaction unit 10 under a temperature of about 500° C. and a pressure of about 20 bar, a temperature drop of about 12° C. occurs when 1% methane is converted under an adiabatic state.

Also, if the processing conditions of the reforming reaction unit 10 are changed due to lack of or excess heat energy supplied from the heat source unit 20 to the reforming reaction unit 10, the entire reaction heat for the reforming reaction unit 10 may be positive, zero or negative depending on the processing conditions. In this case, the composition of the reformate generated from the reforming reaction unit 10 is varied (changed), which may detrimentally influence the performance of a carbon monoxide remover connected to the rear end of the reformer 100 and/or the performance of the fuel cell stack.

Thus, to increase the conversion rate of the first fuel, there is a need not to supply an insufficient or excessive amount of heat energy from the heat source unit 20 to the reforming reaction unit 10, and/or there is a need to supply an appropriate amount of heat energy from the heat source unit 20 to the reforming reaction unit 10.

The first sensor 30 is provided adjacent to a reformate outlet of the reforming reaction unit 10 so as to measure the first temperature of the reformate that is generated (e.g., immediately generated) from the reforming reaction unit 10. For example, in one embodiment, when methane is used as the first fuel, the temperature at an entrance of a catalyst layer in the reforming reaction unit 10 is about 450 to about 650° C. (450 to 650° C.) and the temperature of the reformate generated from the reforming reaction unit 10 is about 800 to about 950° C. (800 to 950° C.), but the temperature at portions of the reformer depends on the structure of the reformer or the arrangement of the catalyst. Therefore, it is difficult to control the temperature of the reformate by simply measuring the temperature of the reforming reaction unit 10. That is, since the temperature of the reforming reaction unit 10 can be controlled in accordance with the temperature of the reformate, the first sensor 30 for controlling the temperature of the reforming reaction unit 10 may be provided to immediately sense the temperature of the reformate generated from the reforming reaction unit 10.

The second sensor 31 is provided adjacent to the heat source unit 20 so as to measure (e.g., precisely measure) the second temperature of the heat source unit 20. That is, the second temperature can be changed depending on the position of the heat source unit 20. For example, the second temperature largely depends on where the measure position of the heat source unit 20 is, i.e., there is a large temperature gradient between an inlet of the second fuel (hereinafter, referred to as a fuel inlet) and an opening for exhaustion (hereinafter, referred to as an exhaust outlet). Particularly, in the case of the oxidation catalyst type reactor, the second temperature may be highest at the fuel inlet due to flame backfired toward the fuel inlet from an oxidation catalyst layer in the heat source unit 20. Thus, when in the case of the oxidation catalyst type heat source unit 20, the second sensor 31 according to one embodiment of the present invention is at (or to) the fuel inlet of the heat source unit 20 into which the second fuel is flowed.

The flow control unit 50 is configured to supply the second fuel and the oxidizer to the heat source unit 20. The flow control unit 50 may be provided with a first flow controller 51a for supplying the oxidizer to the heat source unit 20 and a second flow controller 51b for supplying the second fuel to the heat source unit 20.

In one embodiment, the flow control unit 50 controls the temperature of the reformate generated from the reforming reaction unit 10 by controlling only the supply amount of the oxidizer for the heat source unit 20, and controls the temperature of the heat source unit 20 by controlling only the supply amount of the second fuel for the heat source unit 20.

In another embodiment, the flow control unit 50 controls the supply amount of the second fuel and oxidizer so that the difference between the first and second temperatures is within a certain range. For example, when the second fuel is propane, the flow control unit 50 can control the supply amount of the second fuel and oxidizer so that the difference between the first and second temperatures is within a range of about 64 to 67° C., as illustrated in Table 1.

TABLE 1

| Control Variables | First Temperature (° C.) of Reformate | Second Temperature (° C.) of Heat Source | Difference between First and Second Temperatures (° C.) |
|---|---|---|---|
| Second Fuel ($C_3H_8$) and Oxidizer (Air) | 690 | 625 | 65 |
| | 717 | 650 | 67 |
| | 741 | 675 | 66 |
| | 765 | 700 | 65 |
| | 792 | 725 | 67 |
| | 814 | 750 | 64 |

Changes in the first and second temperatures can be estimated by using the difference between the first temperature (i.e., the sensed temperature of the reformate) and the second temperature (i.e., the sensed temperature of the heat source unit). Accordingly, the supply amount of the second fuel and oxidizer can be effectively controlled.

FIGS. 2A to 2D are flowcharts illustrating a control method for a reformer according to an embodiment of the present invention.

Figure 2A:
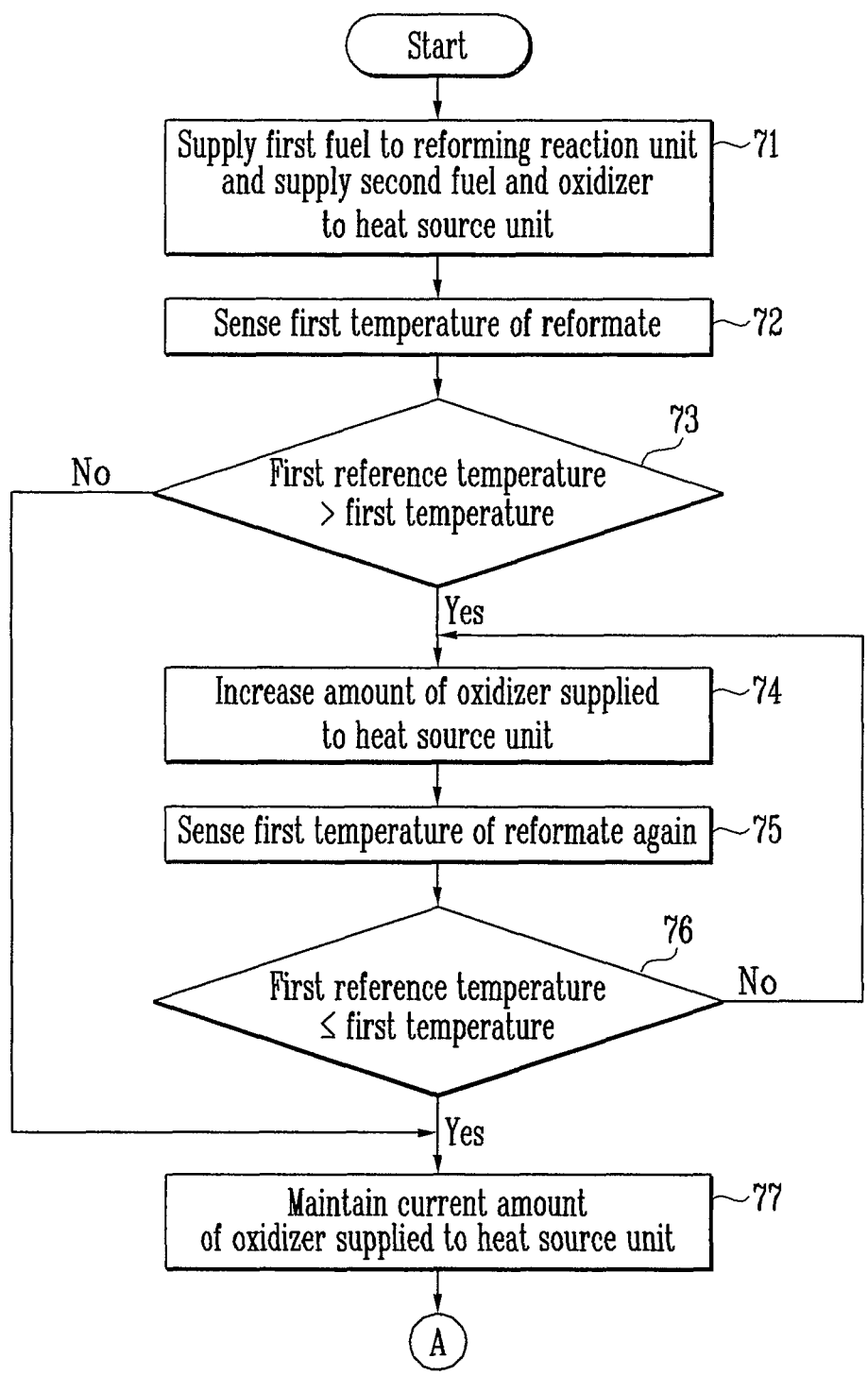

Referring to FIG. 2A together with FIG. 1, to operate the reformer, a first fuel is supplied to the reforming reaction unit 10, and a second fuel and an oxidizer are supplied to the heat source unit (71).

Subsequently, when a certain starting time elapses, the first temperature of a reformate generated from the reforming reaction unit 10 is sensed (72). In one embodiment, when the reformer is started and normally operated, the amount of the first fuel supplied to the reforming reaction unit 10 and the amount of the second fuel and oxidizer supplied to the heat source unit 20 are previously set as a constant depending on the capacities of the reforming reaction unit 10 and the heat source unit 20.

Subsequently, the flow control unit 50 compares the first temperature with a first reference temperature (73). Here, the first reference temperature may be a lower limit in the appropriate temperature range of the reformate. If the first temperature is less than the first reference temperature, the amount of the oxidizer supplied to the heat source unit 20 is increased by a set or predetermined amount (74). However, if the first temperature is identical to or greater than the first reference temperature, some operations (74 to 77) are omitted, and the current amount of the oxidizer supplied to the heat source unit 20 is then maintained (77).

Subsequently, after a certain time elapses, the first temperature is sensed again (76). If the first temperature is identical to or greater than the first reference temperature, the current amount of the oxidizer supplied to the heat source unit 20 is maintained (77). However, if the first temperature is less than the first reference temperature, the amount of the oxidizer supplied to the heat source unit 20 is again increased by a set or predetermined amount (74). Then, the subsequent operations are performed again.

Figure 2B:
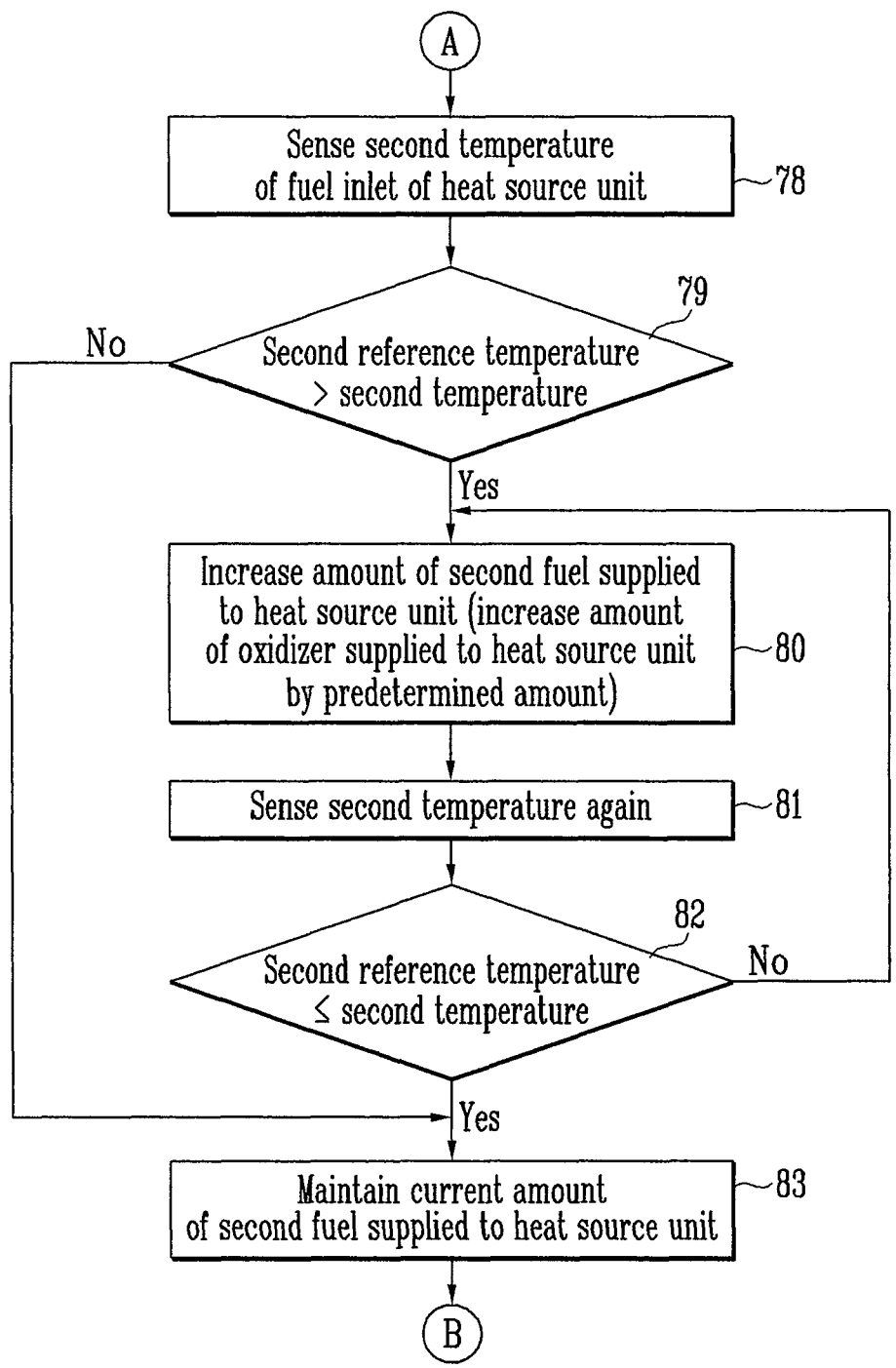

Also, as illustrated in FIG. 2B, in an embodiment, the second temperature of the fuel inlet of the heat source unit 20 is sensed (78). The sensing of the second temperature may be performed after to the aforementioned operations (71 to 77) or may be concurrently or simultaneously performed with the initial sensing of the first temperature. Then, the flow control unit 50 compares the second temperature with a second reference temperature (79). Here, the second reference temperature may be a lower limit in the appropriate temperature range of the heat source unit 20.

Subsequently, if the second temperature is less than the second reference temperature, the amount of the second fuel supplied to the heat source unit 20 is increased by a set or predetermined amount (80). In this operation, only the amount of the second fuel supplied to the heat source unit 20 is increased by a set or predetermined amount while the amount of the oxidizer supplied to the heat source unit 20 is maintained. However, if necessary, e.g., if the first temperature of the reformate is less than the first reference temperature, the amount of the oxidizer supplied to the heat source unit 20 may also be increased by a set or predetermined amount together with the amount of the second fuel supplied to the heat source unit 20. However, if the second temperature is identical to or greater than the second reference temperature, some operations (80 to 82) are omitted, and the current amount of the second fuel supplied to the heat source unit 20 is maintained (83).

Subsequently, after a certain time elapses, the second temperature is sensed again (81). Then, the flow control unit 50 again compares the second temperature with the second reference temperature (82). If the second temperature is identical to or greater than the second reference temperature, the current amount of the second fuel supplied to the heat source unit 20 is maintained (83). However, if the second temperature is less than the second reference temperature, the amount of the second fuel supplied to the heat source unit 20 is again increased by a set or predetermined amount (80). Then, the subsequent operations are performed again.

In one embodiment, the flow control unit 50 continuously senses the first and second temperatures through electromotive forces respectively provided from the first and second sensors 30 and 31. The flow control unit 50 continuously monitors the first temperature of the reformate and the second temperature of the heat source unit 20.

In an embodiment, as illustrated in FIG. 2C, after a certain time elapses, the second temperature of the heat source unit 20 is sensed (84). Then, the flow control unit 50 compares the second temperature with a third reference temperature (85). Here, the third reference temperature may be an upper limit in the appropriate temperature range of the heat source unit 20. Particularly, when the heat source unit 20 is operated at the third reference temperature, the third reference temperature may be a temperature which causes damage to a catalyst provided in the heat source unit 20 or a part of the heat source unit 20. That is, in one embodiment, the third reference temperature is a temperature which may have an undesired effect (e.g., device damage effect) on the heat source unit 20. The third reference temperature is an excessively high temperature that exceeds the operation temperature range of the heat source unit 20.

Subsequently, if the second temperature is identical to or greater than the third reference temperature, the flow control unit 50 stops the second fuel from being supplied to the heat source unit 20 (86). At this time, the flow control unit 50 may simultaneously stop the oxidizer from being supplied to the heat source unit 20. However, if the second temperature is less than the third reference temperature, some operations (86 to 89) are omitted, and the flow control unit 50 then maintains the previous amount of the second fuel supplied to the heat source unit 20 as it is.

Subsequently, after a certain time elapses, the second temperature of the heat source unit 20 is sensed again (87). Then, the flow control unit 50 compares the second temperature with the third reference temperature (88). If the second temperature is less than the third reference temperature, the flow control unit 50 allows the second fuel to be again supplied to the heat source unit 20 (89). However, if the second temperature is identical to or greater than the third reference temperature, the flow control unit 50 maintains the stop of the second fuel from being supplied to the heat source unit 20 (86). Then, the subsequent operations are performed again.

Figure 2D:
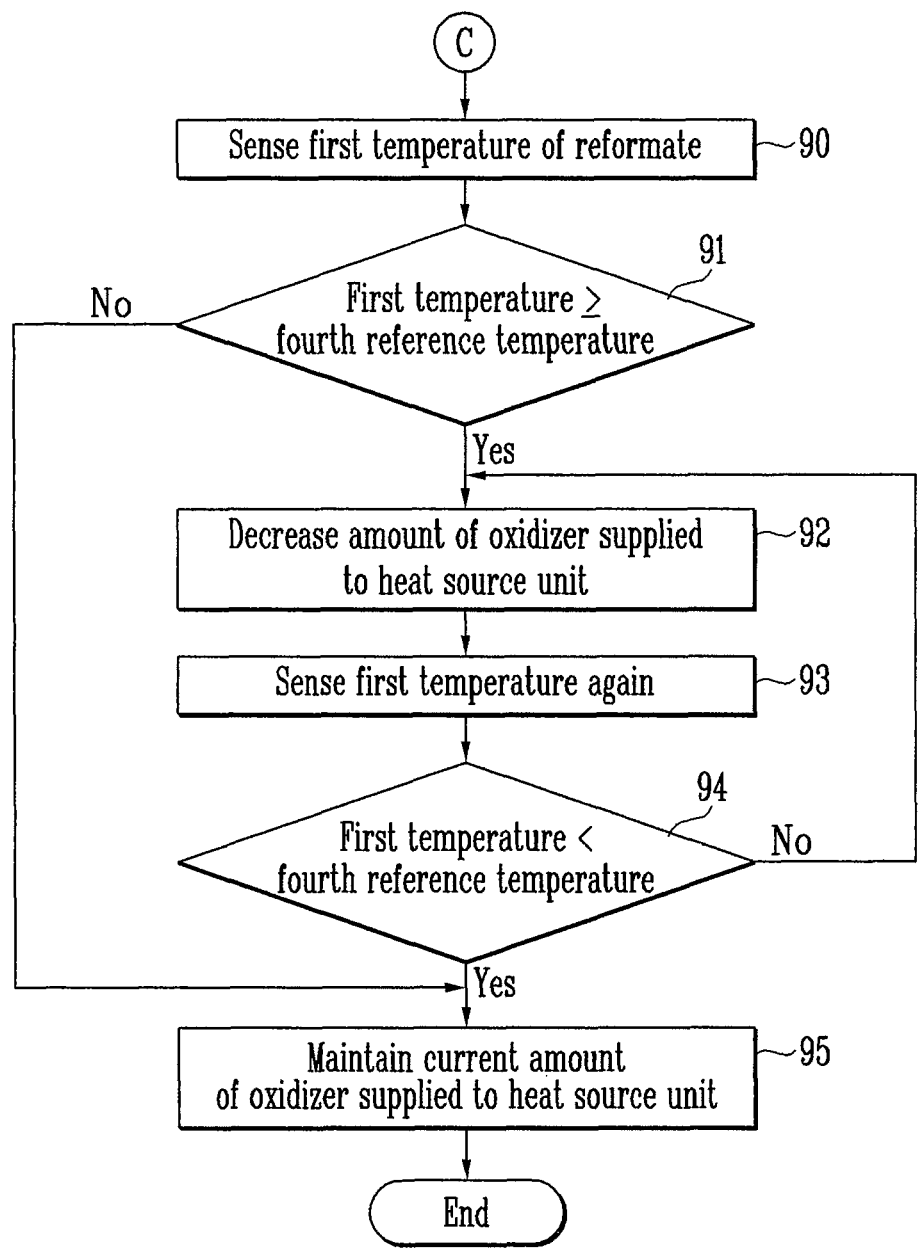

In an embodiment, as illustrated in FIG. 2D, the first temperature of the reformate is again sensed (90). Then, the flow control unit 50 compares the first temperature with a fourth reference temperature (91). Here, the fourth reference temperature may be an upper limit in the appropriate temperature range of the reformate. If the first temperature is identical to or greater than the fourth reference temperature, the amount of the oxidizer supplied to the heat source unit 20 is decreased by a set or predetermined amount (74). Here, the decreasing of the amount of the oxidizer supplied to the heat source unit 20 includes stopping the oxidizer from being supplied to the heat source unit 20 for a certain amount of time (74). However, if the first temperature is less than the fourth reference temperature, some operations (92 to 94) are omitted, and the amount of the oxidizer supplied to the heat source unit 20 is maintained (95).

Subsequently, after a certain time elapses, the first temperature is sensed again (94). If the first temperature is less than the fourth reference temperature, the current amount of the oxidizer supplied to the heat source unit 20 is maintained (95). However, if the first temperature is identical to or greater than the fourth reference temperature, the amount of the oxidizer supplied to the heat source unit 20 is again decreased by a set or predetermined amount (92). Then, the subsequent operations are performed again.

According to the aforementioned configuration, the first temperature of the heat source unit 20 can be controlled by regulating the amount of the second fuel supplied to the heat source unit 20, and the first temperature of the reformate generated from the reforming reaction unit 10 can be concurrently or simultaneously controlled by regulating the amount of the oxidizer supplied to the heat source unit 20. Further, it is possible to rapidly and precisely prevent or protect the heat source unit 20 from being operated at an excessively high temperature. Furthermore, the reformate can be substantially generated at a constant temperature.

Figure 4:
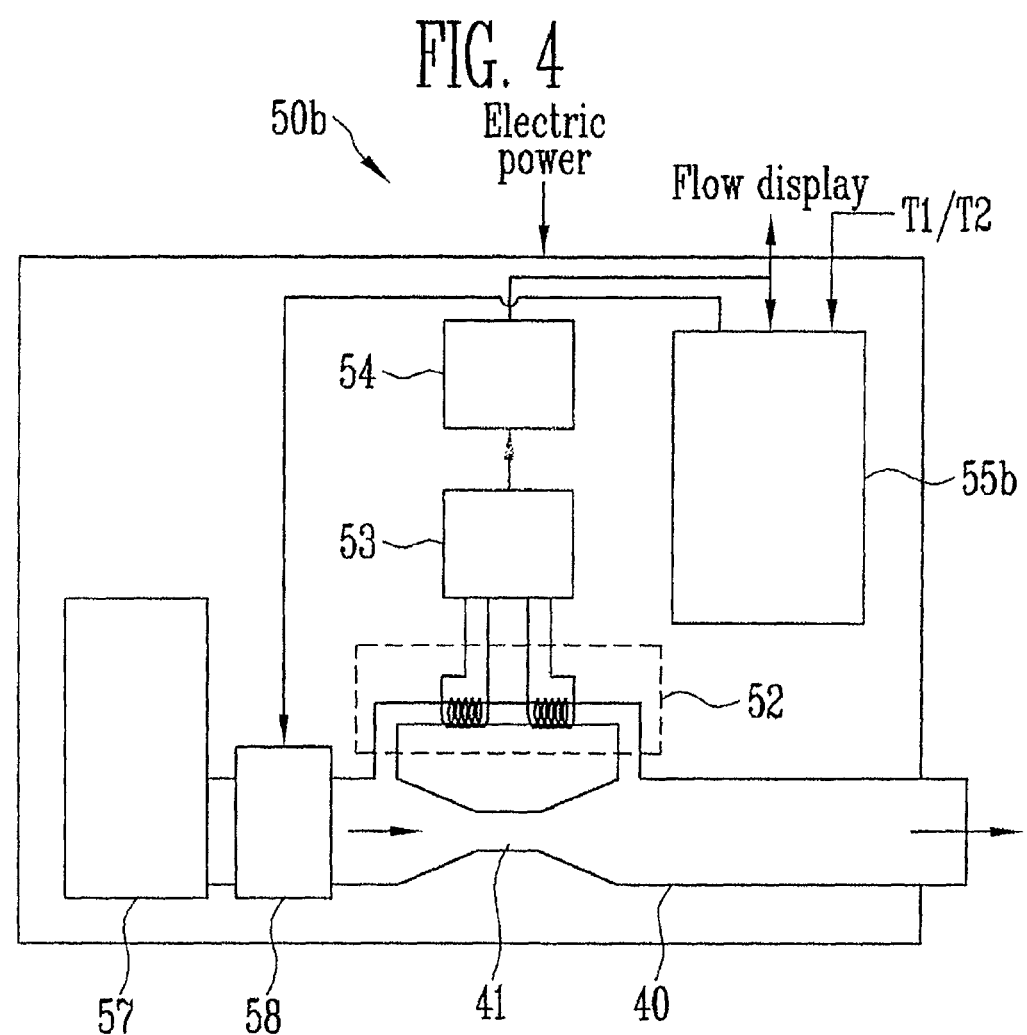
FIG. 4 is a schematic configuration view of a flow control unit according to another embodiment of the present invention.

FIG. 3 is a schematic configuration view of a flow control unit available for the reformer of FIG. 1. FIG. 4 is a schematic configuration view of another flow control unit available for the reformer of FIG. 1.

Referring to FIG. 3 together with FIG. 1, the flow control unit 50a includes a flow sensor 52, a bridge circuit 53, an amplifier circuit 54, a comparator and control circuit 55a and a first valve 56. The flow control unit 50a may be provided with a housing having inlet and outlet ports connected to a pipe 40.

The flow sensor 52 is connected to a bypass portion 41 provided at a middle portion of the pipe 40. That is, the flow sensor 52 is connected to a sub-pipe configured to bypass the pipe 40 from the bypass portion 41. The flow sensor 52 is configured so that the flow of a second fuel or oxidizer passing through the pipe 40 can be sensed by sensing the flow of the second fuel or oxidizer passing through the sub-pipe.

The bridge circuit 53 is a circuit (used in various suitable types of measuring instruments) and may include a Wheatstone bridge circuit. The amplifier circuit 54 appropriately amplifies an output signal of the bridge circuit 53 and provides the amplified signal to the comparator and control circuit 55a. The signal provided from the amplifier circuit 54 to the comparator and control circuit 55a may be used as information for indicating a flow that is displayed on the exterior of the flow control unit 50a.

The comparator and control circuit 55a senses the flow of the second fuel or oxidizer supplied to the heat source unit 20 through the pipe 40. The comparator and control circuit 55a also senses a first temperature T1 provided from the first sensor 30 or a second temperature T2 provided from the second sensor 31. The comparator and control circuit 55a compares the first or second temperature T1 or T2 with a reference temperature.

In one embodiment, the first reference temperature is a lower limit in the appropriate temperature range of the reformate generated from the reforming reaction unit 10, and the fourth reference temperature is an upper limit in the appropriate temperature range of the reformate generated from the reforming reaction unit 10. Further, the second reference temperature is a lower limit in the appropriate temperature range of the fuel inlet of the heat source unit 20, and the third reference temperature is an upper limit in the appropriate temperature range of the fuel inlet of the heat source unit 20.

The comparator and control circuit 55a provides a control signal corresponding to the first or second temperatures T1 or T2 to the first valve 56. The opening degree of the first valve 56 may be automatically controlled by the control signal.

The first valve 56 is connected to the pipe 40 to control the flow of the second fuel or oxidizer flowing into the pipe 40. The first valve 56 includes a proportional control valve. For example, the first valve 56 may include a solenoid valve provided with a solenoid having a magnetic core and a body having one or more orifices.

As illustrated in FIG. 4, the flow control unit 50b according to another embodiment according to present invention may include a flow sensor 52, a bridge circuit 52, an amplifier circuit 54, a comparator and control circuit 55b and a compressor 57. The flow control unit 50b may be provided within a suitable housing.

The compressor 57 may include a tank in which the second fuel or oxidizer is stored under a set or predetermined pressure higher than atmospheric pressure. In this case, the compressor 57 may be provided with a second valve 58 connected to an outlet of the tank so as to control the amount of the second fuel or oxidizer discharged from the tank.

In one embodiment, the flow control unit 50b may provide a control signal corresponding to a first or second temperature T1 or T2 to the second valve 58 so as to control the flow of the second fuel or oxidizer discharged from the tank. The opening degree of the second valve 58 may be automatically controlled by the control signal.

Alternatively, the compressor 57 may include a tank in which a second fuel or oxidizer is stored under the atmospheric pressure. In this case, the compressor 57 may be provided with a pump connected to an outlet of the tank so as to control the amount of the second fuel or oxidizer discharged from the tank. The pump is replaced with the second valve 58 and provided to supply the second fuel or oxidizer stored in the tank to the heat source unit 20 through the pipe 40. That is, the operation of the pump may be automatically controlled by control signals provided from the comparator and control circuit 55*b*.

The aforementioned first and second flow control units 50*a* and 50*b* are configured to control the flow of the second fuel or oxidizer supplied to the heat source unit 20 through the pipe 40 to be 0 to 100%.

Also, it has been described in the aforementioned embodiment that signals for the first and second temperatures respectively sensed by the first and second sensors are directly provided to the flow control unit. However, sensed signals for the first temperature and/or the second temperature may be first inputted to a separate control device provided in a reformer or a system (e.g., a fuel cell system) having the reformer and then converted into set or predetermined signals in the control device or provided to the flow control unit as they are.

Figure 5:
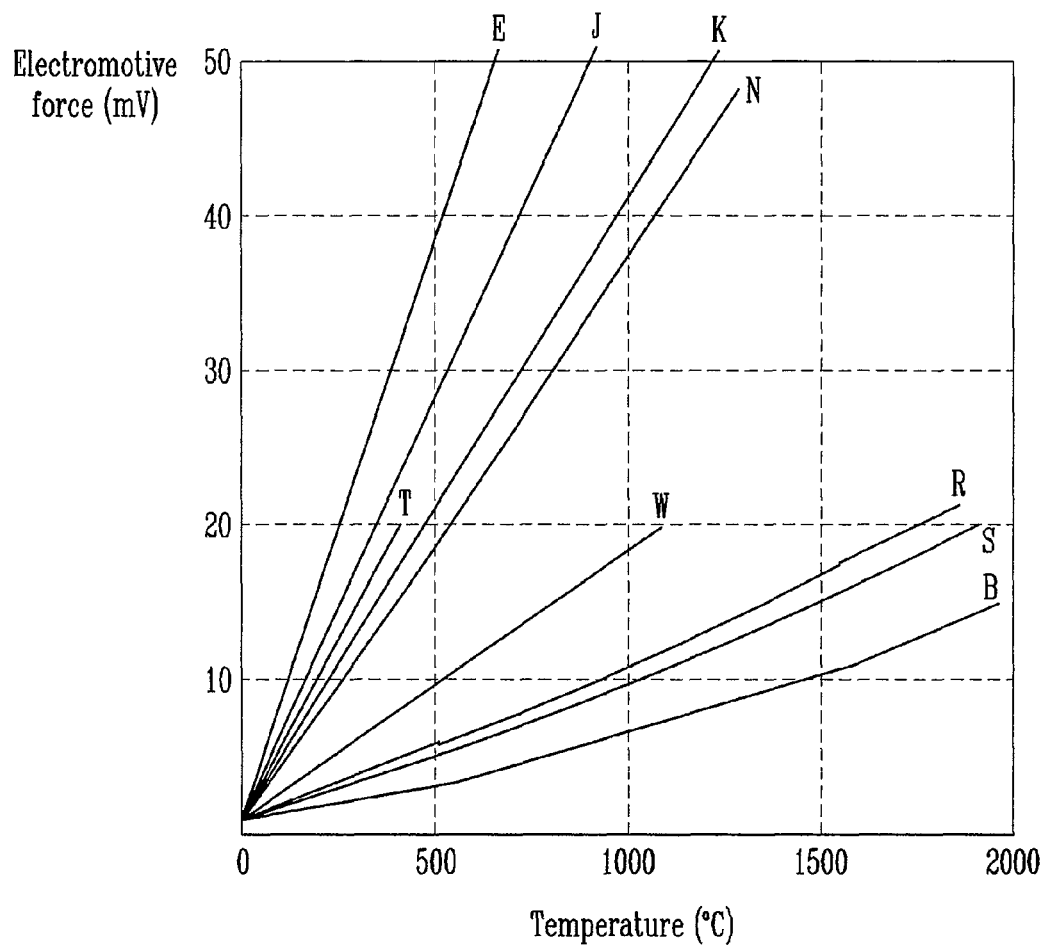
FIG. 5 is a graph illustrating a sensor available for the reformer of FIG. 1.

FIG. 5 is a graph illustrating a sensor available for the reformer and/or the reformer controller of FIG. 1.

Referring to FIG. 5 together with FIG. 1, at least one of the first and second sensors 30 and 31 may includes a thermocouple or sensor having a similar structure to that of the thermocouple. That is, the first and second sensors 30 and 31 may use the thermocouple connected so that a closed circuit is formed with two different kinds of metal conductors. In the case of the thermocouple, if a hot junction comes in contact with an object to be measured while maintaining a difference in temperatures between cool and hot junctions (or measuring junctions), an electromotive force is generated in the closed circuit, and accordingly, the temperature of the object to be measured can be sensed.

In FIG. 5, E, J, T, K, N, W, R, S and B denote different kinds of thermocouples (see Japanese Thermocouple Standard, JIS C 1602-1981, the entire content of which is incorporated herein by reference, and reproduced below in Table 1). For example, E indicates a thermocouple in which Chromel (product name of Hoskins in the U.S.) is formed at a positive (plus) side and Constantan is formed at a negative (minus) side. Here, the Chromel is composed of 90% nickel and 10% chrome, and the Constantan is composed of 55% copper and 45% nickel. By using the electromotive forces measured in the thermocouples, it is possible to easily sense the first temperature of the reformate generated from the reforming reaction unit 10 and the second temperature of the heat source unit 20.

TABLE 1

| TYPE | (The old) JIS | Thermocouple element Plus (+) side | Minus (−) side |
|---|---|---|---|
| B | — | 70% Platinum 30% Rhodium | 94% Platinum 6% Rhodium |
| R | PR* | 87% Platinum 13% Rhodium | 100% Platinum |
| S | — | 90% Platinum 10% Rhodium | 100% Platinum |
| K | CA | Chromel** [90% Ni•10% Cr] | Alumel** [95% Ni•2% Mn•2% Al] |
| E | CRC | Chromel** [90% Ni•10% Cr] | Constantan [55% Cu•45% Ni] |

TABLE 1-continued

| TYPE | (The old) JIS | Thermocouple element Plus (+) side | Minus (−) side |
|---|---|---|---|
| J | IC | 99.5% Iron | Constantan [55% Cu•45% Ni] |
| T | CC | 100% Copper | Constantan [55% Cu•45% Ni] |
| N | — | Nicrosil [84% Ni•14.2% Cr•1.45% Si] | Nisil [95% Ni•4.4% Si•0.15% Mg] |

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A reformer comprising:
   a reforming reaction unit for converting a first fuel into a reformate;
   a first sensor for sensing a first temperature of the reformate generated from the reforming reaction unit;
   a heat source unit for heating the reforming reaction unit with a combustion heat of a second fuel;
   a second sensor for sensing a second temperature at a fuel inlet of the heat source unit; and
   a flow control unit for controlling a temperature of the reformate by regulating a flow of an oxidizer supplied to the heat source unit based on the first temperature sensed by the first sensor, and controlling a temperature of the heat source unit by regulating a flow of the second fuel supplied to the heat source unit based on the second temperature sensed by the second sensor,
   wherein the flow control unit is configured to control the flow of the second fuel and the flow of the oxidizer so that a difference between the first and second temperatures is within a substantially constant range.

2. The reformer according to claim 1, wherein the flow control unit is configured to increase the flow of the oxidizer by a set amount when the first temperature is less than a reference temperature.

3. The reformer according to claim 1, wherein the flow control unit is configured to increase the flow of the second fuel by a set amount when the second temperature is less than a reference temperature.

4. The reformer according to claim 3, wherein the flow control unit is also configured to increase the flow of the oxidizer by a set amount when the second temperature is less than the reference temperature.

5. The reformer according to claim 1, wherein, the flow control unit is configured to stop the second fuel from being supplied to the heat source unit when the second temperature is identical to or greater than a critical temperature.

6. The reformer according to claim 1, wherein the flow control unit comprises at least one valve for regulating the flow of at least one of the second fuel or the oxidizer.

7. The reformer according to claim 6, wherein the flow control unit is configured to automatically control an opening degree of the at least one valve to correspond to a level of at least one of the first and second temperatures.

8. The reformer according to claim 1, wherein the flow control unit comprises at least one compressor for compressing at least one of the second fuel or the oxidizer so as to control the flow of the at least one of the second fuel or the oxidizer.

9. The reformer according to claim 8, wherein a pressure of the compressor is configured to be automatically controlled to correspond to a level of at least one of the first and second temperatures.

\* \* \* \* \*